United States Patent
Brauss et al.

[11] 3,750,370
[45] Aug. 7, 1973

[54] AIR PURIFIER

[75] Inventors: Erhard Brauss; Albert Dercho, both of Windsor, Ontario, Canada

[73] Assignee: Proto Manufacturing Ltd., Windsor, Ontario, Canada

[22] Filed: Dec. 9, 1971

[21] Appl. No.: 206,342

[52] U.S. Cl. .............. 55/279, 21/74 R, 21/DIG. 2, 55/311, 55/316, 55/387, 55/467, 55/481, 55/482, 55/516, 250/42
[51] Int. Cl. .......................................... B01d 45/00
[58] Field of Search ................ 55/279, 309, 310, 55/311, 312, 313, 314, 316, 319, 387, 467, 471, 472, 481, 482, 485, 486, 487, 488, 489, 516, 512, 514; 21/74 R, 53, 74 A, 55, DIG. 2; 204/312, 313, 314, 316, 317, 318, 319; 250/42, 84

[56] References Cited
UNITED STATES PATENTS

| | | | |
|---|---|---|---|
| 2,638,644 | 5/1953 | Rauhut | 55/279 X |
| 2,945,554 | 7/1960 | Berly | 55/279 |
| 3,071,828 | 1/1963 | Cornell, Jr. | 21/74 A |
| 3,072,978 | 1/1963 | Minto | 21/74 R |
| 3,654,534 | 4/1972 | Fischer | 317/262 AE |
| 3,685,258 | 8/1972 | Kostel | 55/467 X |

FOREIGN PATENTS OR APPLICATIONS

| | | | |
|---|---|---|---|
| 529,210 | 9/1921 | France | 204/314 |

*Primary Examiner*—Dennis E. Talbert, Jr.
*Attorney*—Charles Krassov

[57] ABSTRACT

This air purifier consists of a rectangular unit having two opposite grills in its walls through which the air in a room enters and leaves. The Air entering the unit passes through one of the grills which is equipped with a filter containing activated carbon, and before it is discharged through the opposite grill, it is exposed to the action of ultraviolet light. The air is sucked into and forced out of the unit by means of an electrically motorized fan located inside of the unit.

3 Claims, 4 Drawing Figures

PATENTED AUG 7 1973

3,750,370

*Inventors*
ERHARD BRAUSS
& ALBERT DERCHO
*per* Chas. Krassov
*Attorney*

AIR PURIFIER

This invention consists of an air purifier and deodorizer for use in homes or offices for reducing the hazards of pollution to people occuping these premises.

Due to the present day inefficiency in the disposal of industrial and municipal wastes, our air is polluted with numerous disease causing bacteria, viruses, and spores, obnoxious gases and fumes, and many types of pollens to which many people are allegeric. In order to eliminate these pollutants from the air generally, their source will have to be eliminated; however, the concentration of these pollutants can be benefically reduced in homes and offices where people spend a great deal of their lifetime.

By use of this invention, pollen, lint, gases and fumes, bacteria, fungus, spores, and odors are entirely eliminated or reduced to such an extent as to be harmless. This is accomplished by recirculating the air in the room through the air purifier wherein solid particles are trapped, and gases and fumes are absorbed and deodorized by activated carbon filters. Bacteria are destroyed by exposing the said air to the action of ultraviolet light.

Figure 2:
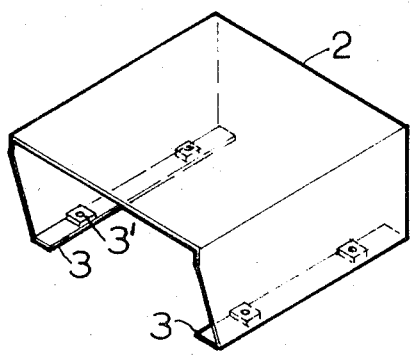
Figure 1:
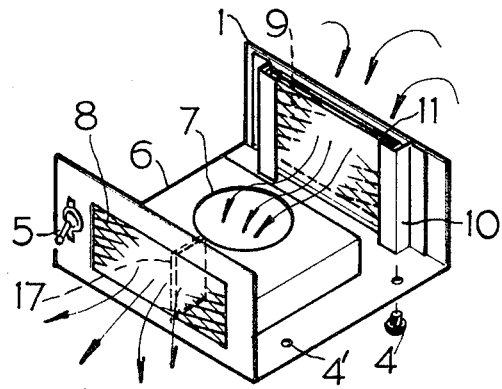
Figure 3:
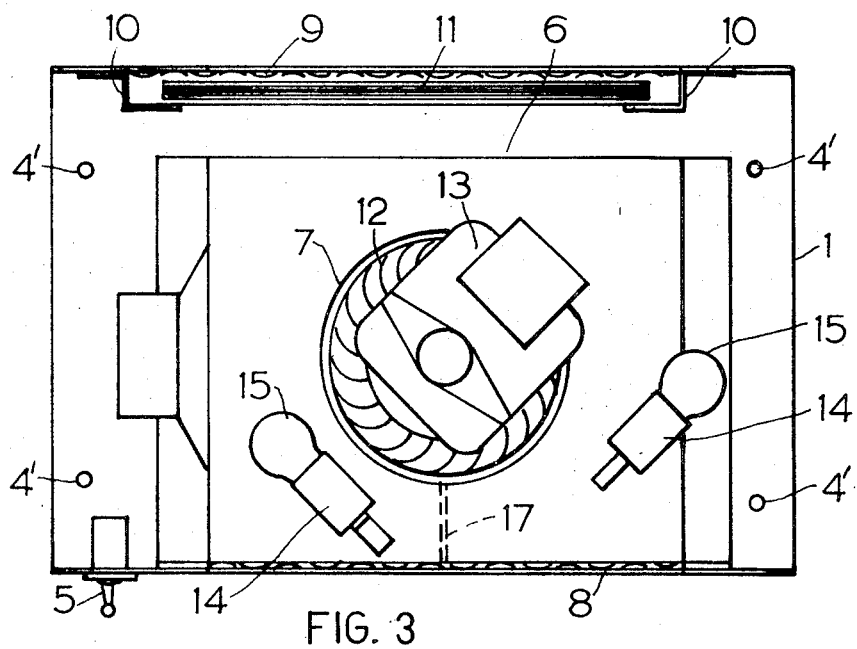
Figure 4:
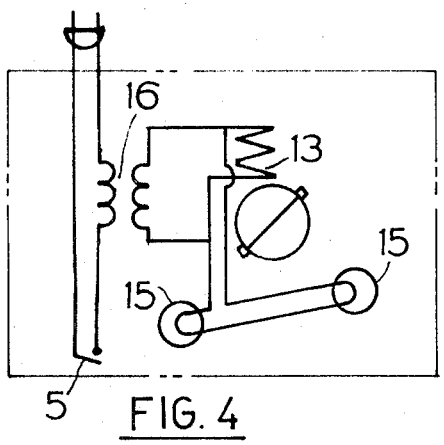

In describing the invention reference will be made to the attached drawing in which, FIG. 1 is an isometric view showing the body of the unit, FIG. 2 is an isometric view showing the cover for the unit, FIG. 3 is a plan view showing the interior of the unit, and FIG. 4 is a wiring diagram of the invention.

In the drawings is shown a rectangular container 1 which consists of a base and two walls. The container 1 is totally enclosed by a cover 2 which is provided with two walls located oppositely to the walls of the said container. The lower edges of the cover walls have re-entrant flanges 3,3, which are provided with tapped holes 3'. The base of the container is provided with holes 4' which correspond with the holes 3'. The cover 2 is attached to the container 1 by means of screws 4 which have rubber tipped heads which in turn serve as legs for the unit.

The wall of container 1 in which is located an air exit grill 8 is considered the front of the unit and it also contains an electric switch 5 by means of which the unit is turned on or off.

One of the items inside the container 1 is a box 6 which contains in the center thereof a fan 12 which rotates in a clockwise direction in a horizontal plane. The said box is attached to the grill 8 which forms one of its walls, but the opposite wall of the said box is not attached to the grill 9, so that a clear space is provided between the box 6 and the grill 9. A centrally located circular hole 7 is provided in the top of the box 6 directly above the fan 12.

The wall of the container 1 opposite to the front wall of the said container, is provided with an air intake grill 9 which is similar to the grill 8. The rear of the grill 9 is provided with two brackets 10,10, which contain a filter 11. This filter consists of two layers of a filtering material having sandwiched between them a layer of activated carbon.

Inside the container 1 is also an electric motor 13 which operates the fan 12, a pair of sockets 14,14, which contain ultraviolet globes 15,15, and a transformer 16.

During the operation of the air purifier unit, the air of the room enters the said unit through the rear grill 9 where it is filtered and deodorized by the filter 11. The filtered air is then acted upon by the ultraviolet light of the globes 15 to clean it of bacteria, etc., it then enters the box 6 through the holes 7 and is discharged into the room through the grill 8.

Tests, during the operation of the air purifier, have shown the discharged air to be free of the above mentioned pollutants. However, occassionally a small amount of ozone is formed as a result of the action of the electrical components within the unit. Where this is found to be objectionable a filter similar to the filter 11 can also be installed in the rear of the grill 8 whereby the ozone odor can be absorbed.

A plate 17 is provided inside of the box 6, centrally located between the edge of the hole 7 and the rear of the grill 8, the purpose of which is to have air entering on one side of it through the grill 8 and discharging through the same grill on the other side of it, when the filter 11 gets plugged and has to be replaced. This is a safety factor to prevent the overloading of the motor 13 until the filter is replaced.

Having described the invention, what we claim is:

1. A domestic air purifying unit comprising an enclosed rectangular container with a removable cover, having an air intake grill in one of its walls and an air discharge grill in its opposite wall, the said intake grill being provided with a filtering and deodorizing medium, and germicidal means; and means for bypassing the said filtering medium when it is plugged; in combination with an electrically motorized fan, ultraviolet light source, an electrical transformer, and an on and off switch, located within the said container.

2. A domestic air purifying unit comprising an enclosed rectangular container which is provided with a removable cover, the said container consisting of a base and two walls, and the said cover having a top and two walls located oppositely to the walls of the container; an air intake grill located in the rear wall of the said container and an air discharge grill located in the front wall of the said container; said intake grill being provided with a filter made up of two layers of fine porous material and a layer of activated carbon between them; in combination with an electrically motorized fan rotating clockwise in a horizontal plane and housed within a rectangular enclosure having an opening directly above the said fan, said fan enclosure being directly connected to the said air discharge grill and contained within the said container; an electric motor to operate the said fan; a plurality of ultraviolet lights located within the said container for germicidal purposes; a transformer for reducing the power source to the required voltage; an on and off switch; and a baffle plate located between the fan and the discharge grill centrally located on that grill.

3. An air purifying unit such as described in claim 2, which is provided with an air filter at the air discharge grill similar to the air filter at the air intake grill.

* * * * *